350-96.1

12/29/87 OR 4,715,671

United States Patent [19]

Miesak

[11] Patent Number: 4,715,671

[45] Date of Patent: Dec. 29, 1987

[54] OPTICAL TRANSMISSION LINK FOR MUSICAL PRODUCTION

[76] Inventor: Edward J. Miesak, #2A 2508 W. Hickory, Denton, Tex. 76201

[21] Appl. No.: 743,008

[22] Filed: Jun. 10, 1985

[51] Int. Cl.[4] .......................... G02B 6/00; G10H 1/00

[52] U.S. Cl. .................................. 350/96.10; 84/1.01; 250/227; 350/96.16; 455/617

[58] Field of Search ............... 350/96.10, 96.15, 96.16, 350/96.24, 96.29, 96.30, 96.23; 250/227; 455/600, 610, 612, 613, 614, 617; 84/1.01, 1

[56] References Cited

U.S. PATENT DOCUMENTS

| | | | |
|---|---|---|---|
| 3,931,512 | 1/1976 | Kent et al. | 455/612 |
| 4,282,605 | 8/1981 | Bose | 455/617 |
| 4,321,463 | 3/1982 | Stecher | 250/227 |
| 4,442,750 | 4/1984 | Bowley | 84/1.01 X |
| 4,667,088 | 5/1987 | Kramer et al. | 235/380 |

OTHER PUBLICATIONS

Ueno et al., "Optical Fiber Communications for Broadcasting Applications", *Intelcon 79: Exposition Proceedings,* (Dallas, Tx.), Feb./Mar. 1979, pp. 172-176.

*Primary Examiner*—John Lee

[57] ABSTRACT

A fiber-optic signal transmission link is used in place of electric audio cable to inter-connect performing musicians and all the necessary pieces of music processing equipment being used in a performance in order to isolate all the people involved in the performance from potential electrical and physical hazards created by the electric audio cables being used.

15 Claims, 6 Drawing Figures

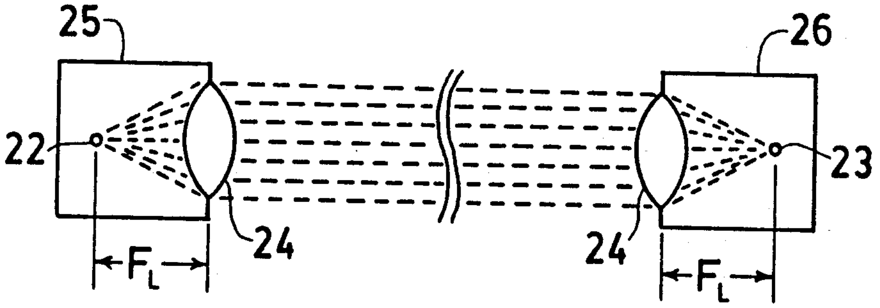
Fig. 2 Ⓒ

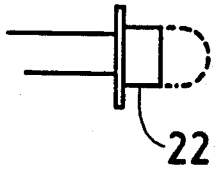
Fig. 2 Ⓓ

OPTICAL TRANSMISSION LINK FOR MUSICAL PRODUCTION

BACKGROUND OF THE INVENTION

Electric equipment is used extensively in the music industry to process sound when producing a musical performance. This processing is done to achieve desirable aesthetic parameters and to amplify the sound enough for the audience to be able to hear the performance easily. The musical performer(s) must be connected to all the necessary processing equipment in said production. The sound originating at the performer(s) and delivered to the audience is in the form of an electric signal between said points. This signal may pass through a plurality of processing equipment located throughout the performance area all needing to be interconnected with each other. This interconnection is currently being done using electric audio cable. Some deficiencies of said cable are:

1. They present a shock hazard. Musicians have been seriously hurt and even killed because through electric audio cable they were connected to a source of high voltage and high power. Members of the audience as well as audio engineers are also in a hazardous position when in the vicinity of said audio cables.

2. Electric audio cable is made from metal and dense insulating materials which must be kept relatively large in order to function adequately. Depositing a plurality of electric audio cables in a single space produces bulky and heavy obstacles which must be physically negotiated by the performers, engineers, and sometimes the audience.

3. Electric audio cable cannot be very large because the signal degrades proportionally with the length of cable it travels through. This is due to a capacitance-resistance effect inherent in said cable.

In the prior art said shock hazard is dealt with by ignoring it or by providing an insulating shield between the instrument or microphone being used and the musician(s) using it. This technique is not without inherent difficulties. When covered with a foam-rubber shield microphone performance degrades, and shielding an electric guitar would require the musician playing it to wear rubber gloves long enough to ensure that the performer's arms would not contact in anyway any piece of the guitar. Wearing rubber gloves and using rubber microphone shields are an unsatisfactory solution to the problem of potential shock hazards from the equipment because they impede the musician's performance ability.

Environmental conditions can aggravate the situation also by creating a more favorable condition for shocks to occur while performing or working with music processing equipment. (Rain, using the equipment while standing on a good conductor such as concrete, grass, or bare earth.)

A central piece of processing equipment used in producing a musical performance is a "Mixer". This device is used to equalize or "balance" all the sound originating on stage and then sending it through the final output speakers. Commonly 50 to over 100 electric audio cables will be plugged into the back of said mixer during a large performance. Said mixer is usually located close to the stage to keep all the electric audio cables being used as short as possible. It must also be located in a favorable listening position so that the audio engineers operating it may adequately hear the output sound and make any necessary corrections.

Based on these two criteria the only reasonable location for said mixer is in front of the performer's stage, directly in the audience. All the cables to and from said mixer are now within easy access to members from the audience. This is an undesirable situation which should be avoided if at all possible.

SUMMARY OF THE INVENTION

This invention will be a direct replacement for existing electric audio cables being used in the music industry to inter-connect performers with all the necessary music processing equipment. It will occupy a complete and ready to use package that is compatible with existing electric music equipment. The user will utilize this invention in exactly the same way as a standard electric audio cable with one exception, this invention will only transmit the signal in one direction, from the source to the destination.

This invention will consist of the following parts:

1. Transmitter. Located at the source of the signal eg. microphone, electric guitar, electric piano, mixer, etc.
2. Transmission Medium. This connects the transmitter with the receiver.
3. Receiver. This will accept the light signal from the transmission medium and convert it to an electric signal compatible with the piece of music equipment its plugged into eg. amplifiers, mixers, tape recorders etc.

SUMMARY OF OPERATION

Signals output from an electric music device (eg. electic guitar, microphone, etc.) are fed into the transmitter using a conventional audio connector. In the transmitter the signals are amplified then used to modulate the output of an LED (Light Emitting Diode) or a laser. (The modulation format used here is analog but a digital modulation format can be used as well.) The modulated light signal is sent via the transmission medium to the receiver. The modulated light is sensed by the receiver using a photo sensitive device such as a Photo Transistor which is used to modulate an electrical source such as an Operational Amplifier. (Or if a Digital modulation format is used a Digital-to-Analog Converter). An equivalent electric signal is produced which is then used as the input signal to a piece of electric music equipment (eg. amplifier, mixer, tape recorder, etc). Said Transmitter and Receiver each have their own power sources eliminating the need to send electricity between pieces of music processing equipment.

The preferred embodiment for this invention is to have said Transmitter, Transmission Medium, and Receiver fabricated into a single operating unit terminating in standard audio connectors. In practice this invention will differ from existing electric audio cables in two respects:

1. The Transmitter and Receiver will each be visibly marked as to their respective functions eg. "Source" for the Transmitter and "Destination" for the Receiver. This will ensure that the user will utilize this invention properly.

2. Each end of this invention will require its own power source. One or more batteries located at each end will adequately suffice.

BRIEF DESCRIPTION OF DRAWING FIGS. 1,2,3

FIG. 1 is an electrical schematic illustrating said Transmitter portion of the invention.

FIGS. 2(*a*), 2(*b*), 2(*c*) and 2(*d*) are generally schematic front elevations of said Transmission Medium portion of the invention.

FIG. 3 is an electrical schematic illustrating said Receiver portion of the invention.

TABLE OF ELEMENTS SHOWN IN FIGS. 1,2,3.

1. 2 conductors ¼" dia. Male Phone Plug.
2. Tantalum Capacitor 1 μF.
3. Resistor 200K ohms.
4. Resistor 60K ohms.
5. Field Effects Transistor 2N3821.
6. Resistor 5.6K ohms.
7. Infrared Emitting Diode Motorola #MFOE71.
8. PNP Silicon Transistor 2N4250.
9. Resistor 200 ohms.
10. Potentiometer 5K ohms.
11. Tantalum Capacitor 10 μF.
12. Nine Volt Battery.
13. Operational Amplifier PMI #OP07.
14. Resistor 1.7M ohms.
15. Photo Diode Motorola #MFOD71.
16. (Purposely Omitted.)
17. (Purposely Omitted.)
18. 1000 Micron Core Plastic Fiber DuPont #OE1040, Eska SH4001
19. (Purposely Omitted.)
20. (Purposely Omitted.)
21. (Purposely Omitted.)
22. Light Emitting Diode Hewlett Packard #HLMP-3750.
23. Silicon Photodiode Siemens #BPX 61.
24. Converging Lens, 1" dia. 20 mm focal length.
25. Enclosure for LED(22) and Lens (24).
26. Enclosure for Detectors (23) and Lens (24).

DETAILED DESCRIPTION OF INVENTION

Figure numbers in the following description refer to Figure numbers on the enclosed drawings. During the course of this description like numbers will be used to indicate like elements in the different figures which illustrate the invention. Said elements are summarized in the table of elements above.

Source: Any standard music device producing an amplitude modulated electric signal at its output during operation such as electric guitars, microphones, electric pianos, synthesizers, electric organs etc.

Figure 1:
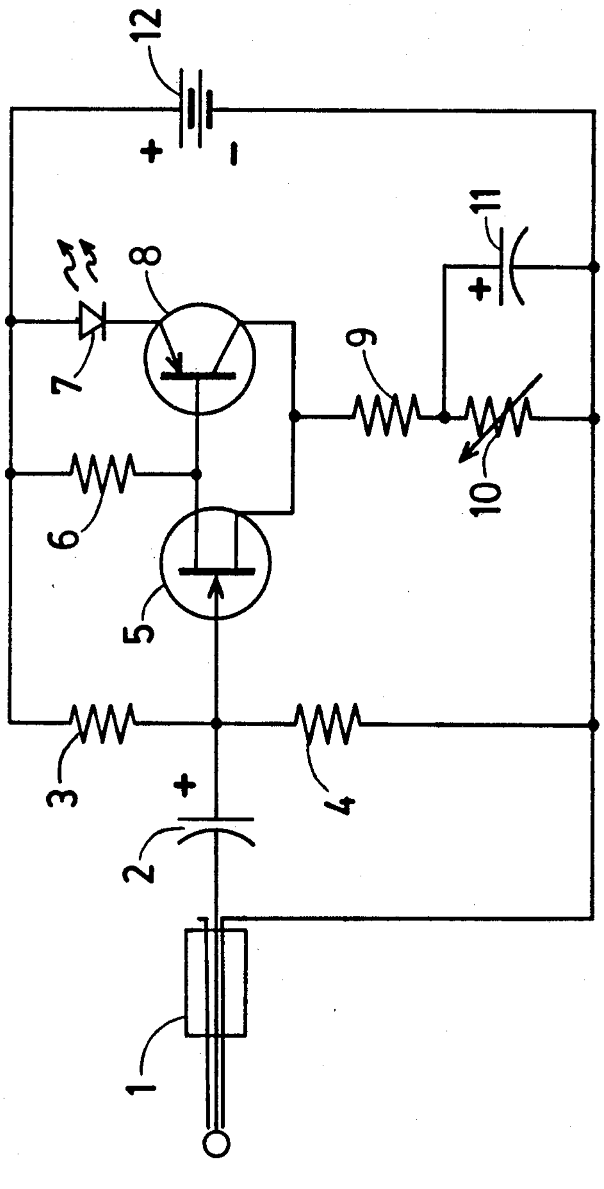

Referring now to Fig.1. phone plug (1) accepts an amplitude modulated electric signal from said Source. Capacitor (2) decouples the transmitter circuitry from said source to eliminate any noise flow. Resistor (3) and resistor (4) together set the current drain through transistor (8). Transistor (5) amplifies the amplitude modulated electric signal from said Source. Registor (6), resistor (9), and potentiometer (10) together set the gain for transistor (5) and the current drain for transistor (8). Capacitor (11) prevents any AC voltage from reaching potentiometer (10) which would cause the voltage drop across said potentiometer to fluctuate and thereby causing the gain in the circuit illustrated to fluctuate, LED (7) is driven by transistor (8). The light from LED(7) is intensity modulated and is directly proportional to the amplitude modulated electric signal coming from said Source. One battery (12) powers the entire circuit illustrated in FIG. 1.

Figure 2:
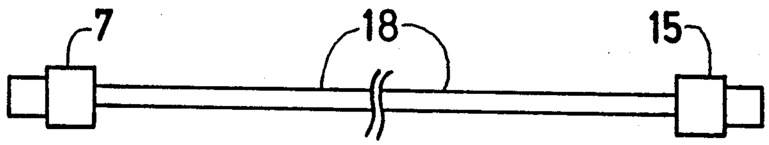
Figure 2:
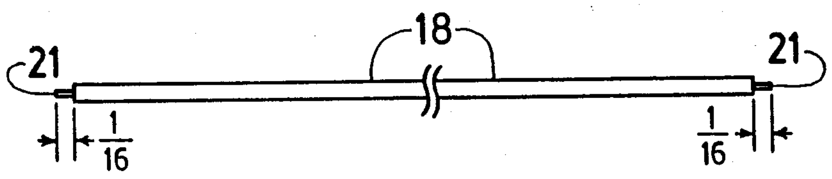

Referring now to FIG. 2. FIG. 2-A illustrates using a Fiber Optic (18) to carry the intensity modulated light signal from LED(7) to detectors (15). The Fiber Optic (18) must be properly prepared before being installed. FIG. 2-B illustrates preparing Fiber Optic (18) for installation. FIG. 2-B illustrates that 1/16 of an inch of protective cladding must be removed from each end of the Fiber Optic (18) to allow the ends (21) to physically contact the active elements of LED (7) and detector (15). A sharp knife can be used to remove the proper amount of protective cladding. The ends (21) of the Fiber Optic (18) must also be polished flat using 600 grit sandpaper and then buffed using ordinary writing paper to produce an optical quality finish which will minimize signal loss and noise.

FIG. 2-C illustrates using a clear path through the air to carry the intensity modulated light signal from LED (22) to detector (23). LED (22) and detector (23) are better suited to perform this application than are LED (7) and detector (15). LED (22) is directly interchangeable with LED (7) and detector (23) is directly interchangeable with detector (15) in the circuitry illustrated.

Enclosures (25) and (26) are constructed of metal, plastic, wood, or some other opaque material which will retain its shape during the abuse of ordinary use. Said enclosures will be light tight except for an aperture in each enclosure where lens (24) will be mounted. Enclosures (25) and (26) are identical, and will differ only in that one will contain LED (22) while the other will contain detector (23). Lens (24) and LED (22) will be mounted in proper optical alignment with regards to each other inside enclosure (25). Lens (24) and detector (23) will be mounted in proper optical alignment with regards to each other inside enclosure (26).

Proper optical alignment for enclosure (25) is defined as follows. (Proper optical alignment for enclosure (26) is identical as that for enclosure (25) but substituting detector (23) for LED (22).) LED (22) will be permanently mounted one focal length away from, and directly on center with lens (24). The optical portion of LED (22) will be facing towards lens (24). LED (22) will be mounted inside enclosure (25) in such a way as to facilitate proper electrical contact from outside enclosure (25) while not allowing any extraneous light to enter enclosure (25). The construction techniques used in building enclosure (25), and the mounting techniques used in securing LED (22) and lens (24) in enclosure (25) will be of the quality as to guarantee that the complete system remains in proper optical alignment with use over time.

Enclosure (25) contains lens (24) to collect and collimate the light output from LED (22). Enclosure (25) will be used to aim the enclosure (26). Enclosure (26) contains lens (24) to collect the collimated intensity modulated light signal from LED (22) to enclosure (26). Enclosure (26) contains lens (24) to collect the collimated intensity modulated light signal from enclosure (25) and focus it onto detector (23). Enclosure (26) will be placed in a convenient location for use and in direct line of signt of enclosure (25). When in use the lenses (24) of both enclosures (25) and (26) must remain facing each other. This is done to maximize the signal and minimize the noise in the entire system.

FIG. 2-D illustrates preparing LED (22) for installation by polishing the end flat using 600 grit sandpaper and then buffing the polished end using ordinary writing paper. This is done to minimize signal loss and noise.

Figure 3:
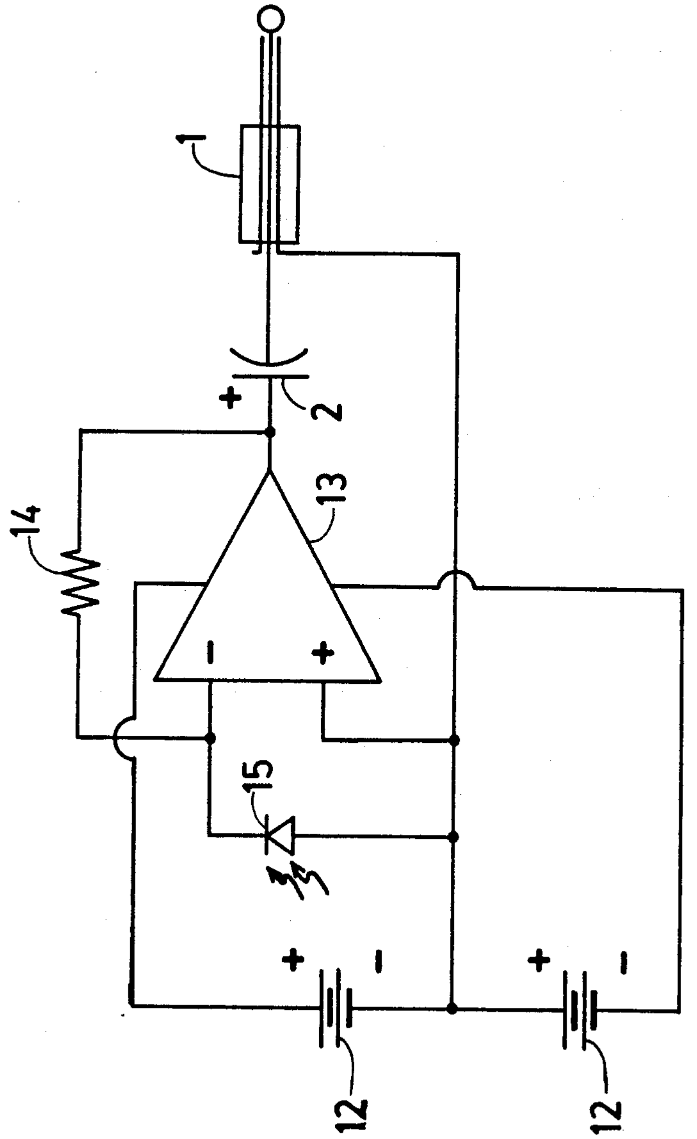

Referring now to FIG. 3 the detector(15) receives the intensity modulated light signal from said Transmission Medium and converts it to an amplitude modulated electric signal which is amplified by being fed into the inverting input of an operational amplifier (13). Resistor (14) sets the gain of said operational amplifier. Capacitor (2) prevents any DC voltage from reaching phone plug (1) which would manifest itself as an audible hum coming from the output of Destination. The modulated electric signal at phone plug (1) which now exactly matches said signal coming from said Source is applied to Destination through phone plug (1). Two batteries (12) power the entire circuit illustrated in FIG. 2.

Destination: Any standard music device requiring an amplitude modulated electric signal at its input in order to operate such as amplifiers, mixers, tape recorders etc.

I claim:

1. A shock eliminating audio signal transmission link for use by performing musicians, comprising
- a musical instrument,
- a first standard audio connector for connection to said musical instrument, said connector having a first electrical contact,
- source electro-optical transducing means in electrical communication with said first contact at a source location for transducing a sound electrical signal received at said contact into a corresponding light signal,
- a second standard audio connector having a second electrical contact,
- receiving electro-optical transducing means in electrical communication with said contact at a receiving location remote from said source location for converting said light signal into a corresponding received sound electrical signal and delivering the same to said second contact, and
- means for transmitting said light signal between said source and receiving electro-optical transducing means.

2. A link as in claim 1 wherein said source electro-optical transducing means comprises a light emitting diode.

3. A link as in claim 1 wherein said receiving electro-optical transducing means comprises a reversed biased silicon junction detector.

4. A link as in claim 1 wherein said light signal transmitting means comprises an optical fiber.

5. In combination with a musical instrument, a compact multi-channel audio signal transmission. cable for use by performing musicians comprising,
- a first standard audio connector for connection to said musical instrument, said connector having a first plurality of electrical contacts,
- a source electro-optical transducing means in electrical communication with said first plurality of electrical contacts at a source location for transducing sound electrical signals received at said contacts into respective corresponding light signals,
- a second standard audio connector having a second plurality of electrical contacts,
- a receiving electro-optical transducing means in electrical communication with said second plurality of electrical contacts at a receiving location remote from said source location for converting said respective light signals into corresponding sound electrical signals and delivering the same to respective ones of said second plurality of contacts,
- and a plurality of means for transmitting said light signals between source and receiving electro-optical transducing means.

6. A cable as in claim 5 wherein said source electro-optical transducing means comprises a plurality of light emitting diodes.

7. A cable as in claim 5 wherein said receiving electro-optical transducing means comprises a plurality of reversed biased silicon junction detectors.

8. A cable as in claim 5 wherein said plurality of light signal transmitting means comprises a plurality of optical fibers.

9. In a musical production system having a musical instrument for producing sound electrical signals, sound signal processing equipment for acting on said sound electrical signals, and plug means for connecting said instrument to said processing equipment for transmission of said sound electrical signals, the improvement comprising said means having:
- a first standard audio connector having a first electrical contact,
- source electro-optical transducing means in electrical communication with said first contact at a source location for transducing a sound electrical signal received at said contact into a corresponding light signal,
- a second standard audio connector having a second electrical contact,
- receiving electro-optical transducing means in electrical communication with said second contact at a receiving location remote from said source location for converting said light signal into a corresponding sound electrical signal and delivering the same to said second contact, and
- means for transmitting said light signal between said source and receiving electro-optical transducing means.

10. An improvement as in claim 9, wherein said first and second audio connectors comprise male phone plugs.

11. An improvement as in claim 10, wherein said source electro-optical transducing means comprises a light emitting diode.

12. An improvement as in claim 10, wherein said light signal transmitting means comprises a light pipe.

13. An improvement as in claim 12 wherein said receiving electro-optical transducing means comprises a reversed biased silicon junction detector.

14. An improvement as in claim 12, wherein said light pipe is an optical fiber.

15. An improvement as in claim 9, wherein said light signal transmitting means comprises a light transmitter and a light detector in optical alignment with each other.

* * * * *